(12) United States Patent
Large et al.

(10) Patent No.: US 6,727,882 B1
(45) Date of Patent: Apr. 27, 2004

(54) METHOD AND APPARATUS FOR MATRIX ADDRESSING OF AN ELECTROPHORETIC DISPLAY DEVICE

(75) Inventors: Timothy Large, Essex (GB); Keith Gardner, Cambridge (GB)

(73) Assignee: The Technology Partnership PLC, Hertfordshire (GB)

( * ) Notice: Subject to any disclaimer, the term of this patent is extended or adjusted under 35 U.S.C. 154(b) by 0 days.

(21) Appl. No.: 09/581,656
(22) PCT Filed: Dec. 18, 1998
(86) PCT No.: PCT/GB98/03844

§ 371 (c)(1),
(2), (4) Date: Aug. 17, 2000

(87) PCT Pub. No.: WO99/32932
PCT Pub. Date: Jul. 1, 1999

(30) Foreign Application Priority Data

Dec. 18, 1997 (EP) .............................................. 97310286

(51) Int. Cl.⁷ .................................................. G09G 3/34
(52) U.S. Cl. ........................................ 345/107; 359/296
(58) Field of Search ................................ 345/107, 204, 345/208, 211; 359/294–297; 252/570, 572

(56) References Cited

U.S. PATENT DOCUMENTS

| 4,680,103 | A | * | 7/1987 | Beilin Solomon et al. .. 359/296 |
| 4,732,830 | A | * | 3/1988 | DiSanto et al. ................ 430/20 |
| 4,742,345 | A | * | 5/1988 | Di Santo et al. ............ 345/107 |
| 4,772,820 | A | * | 9/1988 | DiSanto et al. ............. 313/505 |
| 5,177,476 | A | * | 1/1993 | DiSanto et al. ............. 345/107 |
| 5,304,439 | A | * | 4/1994 | Disanto et al. ................ 430/20 |
| 5,573,711 | A | * | 11/1996 | Hou et al. ................... 252/572 |

* cited by examiner

Primary Examiner—Kent Chang
(74) Attorney, Agent, or Firm—Dykema Gossett PLLC

(57) ABSTRACT

An electrophoretic display has a matrix addressing structure which includes a first support structure 10 on one side of the display and a second support structure 20, substantially parallel to the said first support structure, on the other side of the display. On the inner surface 12 of the first support structure 10 there is a first set of parallel electrodes 11 and on the facing the inner surface 23 of the second support structure 20 there are second 22 and third 21 sets of parallel electrodes arranged substantially orthogonal to the first set of electrodes 11. The electrodes 21,22 of the second and third sets are interspersed with one another.

15 Claims, 6 Drawing Sheets

9V2

9V3

10V2

10V3

METHOD AND APPARATUS FOR MATRIX ADDRESSING OF AN ELECTROPHORETIC DISPLAY DEVICE

The present invention relates to methods of and apparatus for displaying electronically stored information in a human readable form.

Flat panel displays are now part of everyday life. The best known type is the liquid crystal display (LCD) which is used widely in application varying from watch displays to large screen television displays. The technology is applied in household products, the automotive and aerospace industries, medical products and professional products. The above list is not exhaustive, but indicates how widely the technology is used.

Despite the wide range of applications of LCDs, they are not perfect for all applications. Indeed, cathode ray tubes (CRTs) are still very widely used. Other flat panel display technologies exist, although none has the significance of LCDs.

One shortcoming of conventional LCD technology is that it cannot be viewed at a high angle of incidence. In fact many LCDs are not readable at as little as only 20 degrees off-axis. This is largely due to the fact that LCDs utilise an electro-optic effect which occurs through the depth of the display. CRTs in contrast operate by causing a phosphor coating to emit light when it is bombarded by electrons. This is a surface effect which can be seen from a wide range of angles of incidence.

A different type of display technology which has not been widely adopted is the electrophoretic display (see for example Ota et. al. *Proc. IEEE,* July 1973, pp. 832–836). The basic principle exploited in an electrophoretic display (see FIG. 1) is that when charged particles are placed in an electric field they will migrate along the field lines. If relatively light coloured particles are suspended in a dark liquid between transparent electrodes, then the electrodes will take the colour of the particles when they are driven towards the electrodes. By segmenting the electrodes, a pattern of the particles can be selectively laid down to form a display.

When the display is viewed, the viewer sees the scattered particles. The effect is very similar to that of viewing paper as there is no change in contrast with viewing angle. This is a significant advantage over the LCD. However, owing to the fact that the display operates by particles migrating across the cell, the speed of operation is not as fast as that of a liquid crystal display.

A second difficulty with electrophoretic display technology, and one which has limited the exploitation of this technology to date, is the fact that there is no threshold for the electrophoretic effect, in other words, whatever electric field is applied to the cell the particles move. This means that a simple row and column matrix addressing system cannot be implemented. The virtues of a matrix addressing scheme have been described by several authors, for example Alt and Pleshko (*IEEE Transactions on Electron Devices,* Vol ED-21, No. 2 February 1974 pp146–155). The benefit of a matrix addressing scheme is that a 2 dimensional array consisting of N rows and M columns (i.e. N×M pixels) can be addressed by N+M address lines.

Matrix addressing schemes for use with electrophoretic displays have been developed, for example by Dalisa (U.S. Pat. No. 4,203,106) and CopyTele (U.S. Pat. No. 4,655,987). However these require additional electrodes to be inserted between the cell walls (see FIG. 2). This is a complex manufacturing task.

According to the present invention there is provided an electrophoretic display having a matrix addressing structure comprising:

a first support structure on one side of the display, and on the inner surface of which are disposed a first set of parallel cathodes or anodes;

a second support structure on the other side of the display and arranged substantially parallel to the said first support structure, the second support structure having a surface facing the inner surface of the first support structure, said surface having disposed thereon a set of grid electrodes and a parallel set of anodes or cathodes respectively, the grid electrodes and anodes or cathodes being arranged substantially orthogonal to the set of cathodes or anodes respectively and being interspersed with one another.

Preferably, the grid electrodes and the anode or cathodes on the second support structure are interleaved with one another and they may be interdigitated with one another.

By adjusting the voltages on the gird electrodes and the anodes or cathodes and on the cathodes or anodes, the form of the potential gradient between the two parallel support structures can be controlled. For example, the field gradient can be linear or it can take the form of a potential well.

In the case that the particles in the display have a positive charge, then the grid and anode/cathode electrodes are positive with respect to the cathode/anode electrodes. In the case that the particles in the display have a negative charge, then the grid and anode/cathode electrodes are negative with respect to the cathode anode electrodes.

Advantageously, the cathodes or anodes on the first support structure form a set of column electrodes, the grid electrodes are connected in common, and the anodes or cathodes respectively on the second support structure form a set of row electrodes. The anodes or cathodes respectively on the second support structure may be connected in subsets of n electrodes, for example three electrodes per subset. Independently addressable row and column electrodes can thus be provided.

Preferably, the two support structures are separated by a distance of between 5 and 500 microns, and the space between them is filled with an insulating liquid in which a dye is dissolved. The liquid contains coloured particles and a particle charging agent.

Such a display may be integrated with other standard components and used to display variable price and other information, for example in a supermarket, or to form an electronic readout device for electronically stored information, such as an electronic book.

The invention also includes a method of operating an electrophoretic display as defined above, the method comprising the steps of:

(A) maintaining the grid electrodes and the anodes or cathodes at a relatively low voltage, while maintaining the cathodes or anodes at a relatively high voltage;

(B) placing the grid electrodes at a relatively high voltage;

(C) placing a voltage on selected ones of the cathodes or anodes intermediate that placed on the grid electrodes and the anodes or cathodes;

(D) raising the voltage on a selected one of the anodes or cathodes to the level of the voltage on the grid electrodes for a predetermined time and then lowering it again in order to adjust the display of individual pixels in the row corresponding to the selected cathode or anode; and (E) repeating steps (C) and (D) as required in order to adjust the display of pixels in all rows as required.

In comparison with LCDs, switching can be much simpler as the display operates on DC voltages for both row and column electrodes, which can thus be driven by corresponding sets of relatively simple electronic switches.

One example of an electrophoretic display according to the present invention will now be described with reference to the accompanying drawings, in which:

FIG. 1 illustrates the basic operation of an electrophoretic cell;

FIG. 2 illustrates the construction of an electrophoretic cell according to U.S. Pat. No. 4,203,106;

Figure 1:
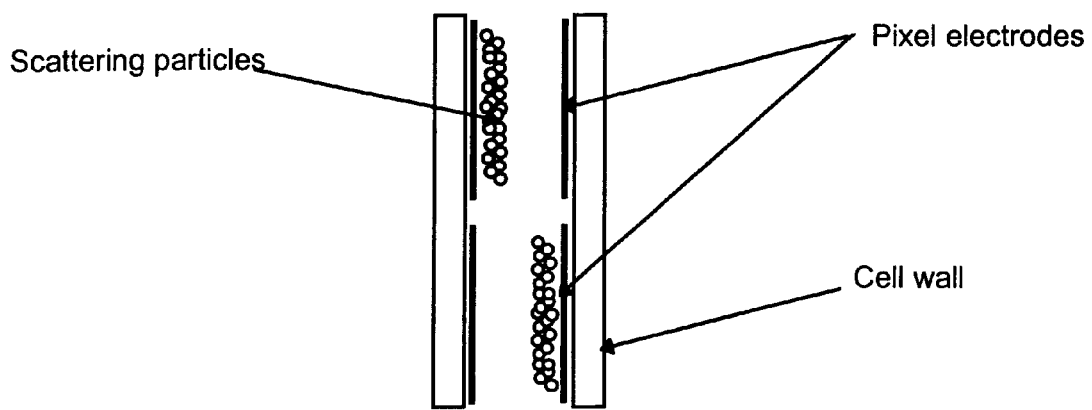
Figure 2:
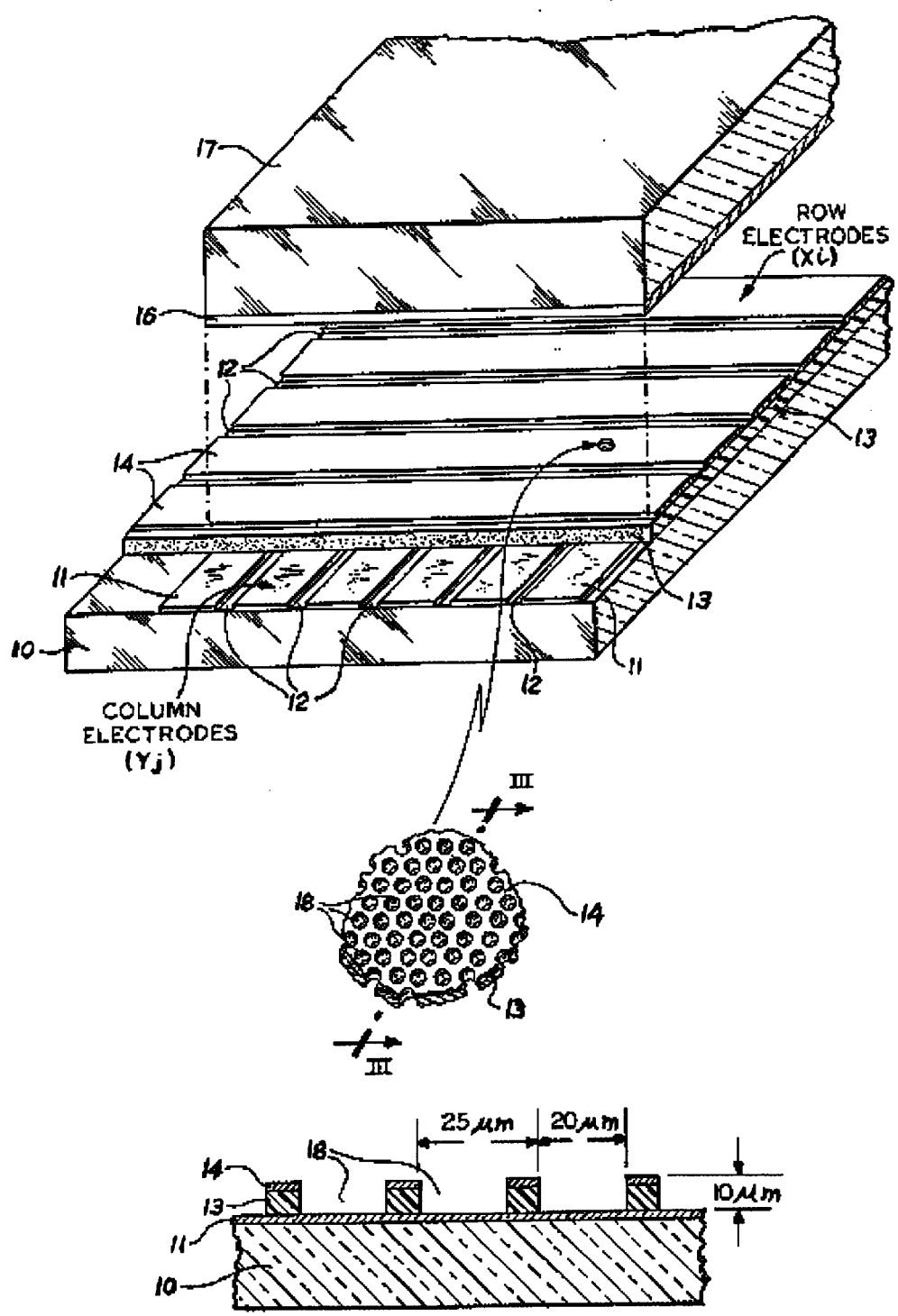
Figure 3:
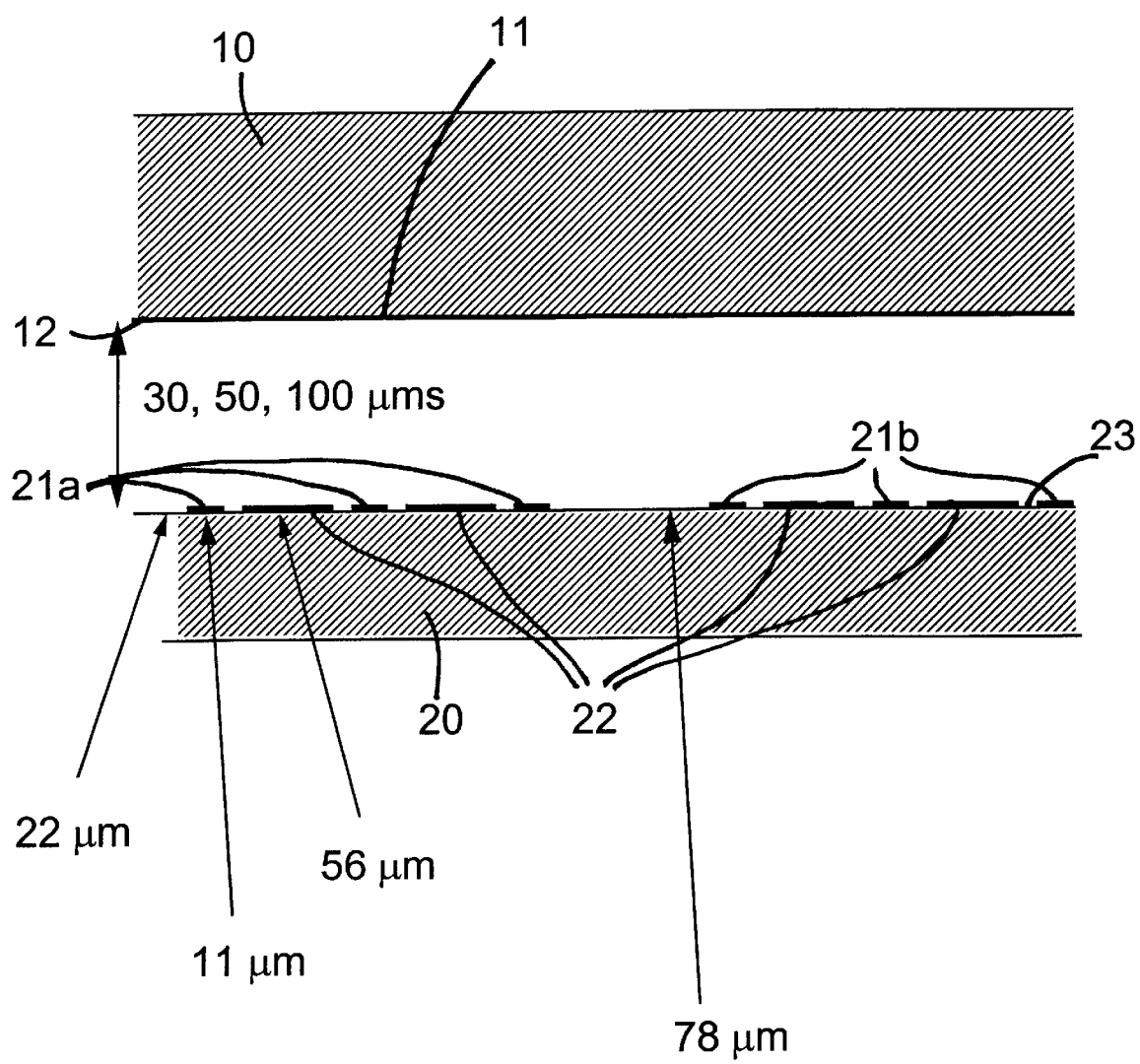
FIG. 3 is a diagrammatic cross-section through part of a display according to the invention.
Figure 5:
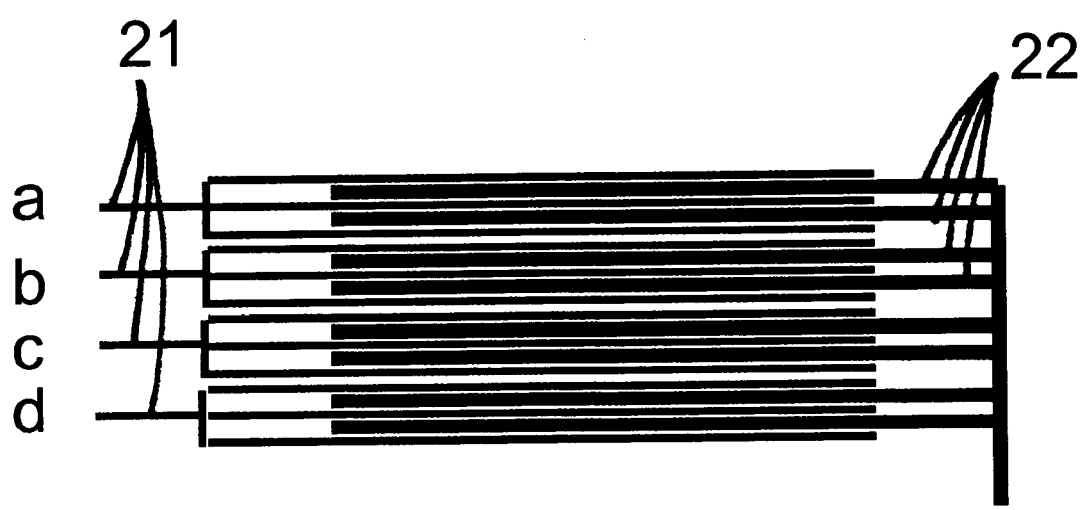
FIG. 5 illustrates a plan view of the form of interdigitation of the row electrodes.

Referring now to FIG. 3 and FIG. 5, there are shown first 10 and second 20 support structures of an electrophoretic display 1, on the facing inner surfaces 12,23 of which are disposed, respectively, a set of column electrodes 11 (extending left-right in FIG. 3) and two sets of orthogonal electrodes 21,22 (extending front-back in FIG. 3). The two sets of orthogonal electrodes 21,22 comprise (a) individually addressable subsets 21a,21b of three row electrodes 21 and (b) commonly addressable grid electrodes 22. The structure 10 comprises the display side of the device.

From FIG. 5 it can be seen how the grid electrodes 22 are commonly connected and interdigitated with the row electrodes 21 and how the latter are disposed in subsets a–d, each comprising three connected electrodes 21. Two grid electrodes 22 are interdigitated with each subset of row electrodes 21.

For the purpose of modelling the performance of a cell of a display of this type by using electrostatic modelling software, the widths of the grid electrodes is 56 microns, the width of the row electrodes is 22 microns and the gap between the two sets of electrodes is 11 microns. The separation between adjacent sets of electrodes is 78 microns. The performance of the cell was modelled for a separation between the opposing surface of 30, 50 and 100 microns.

A specific set of voltages applied to the individual electrodes 11,21,22 is shown in the table below for a cell gap of 100 microns.

| Grid V1 | Row deselect V2 | Row select V3 | Column V4/V5 |
|---|---|---|---|
| 36 | 0 | 36 | 26 |
| 36 | 0 | 36 | 36 |

Figure 4:
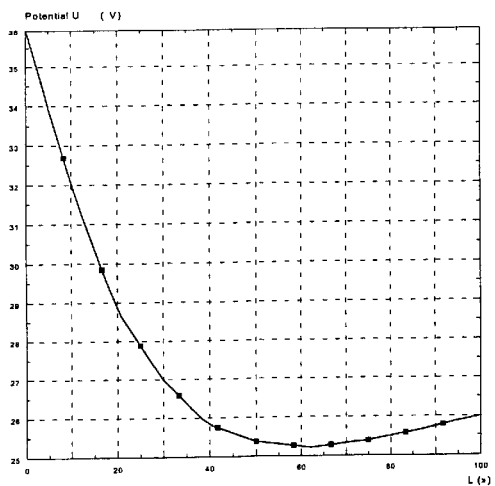
FIG. 4 illustrates electric field distribution across the cell of FIG. 3.
Figure 4:
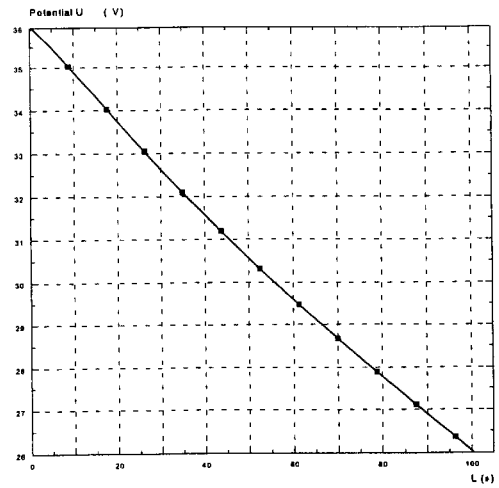
Figure 4:
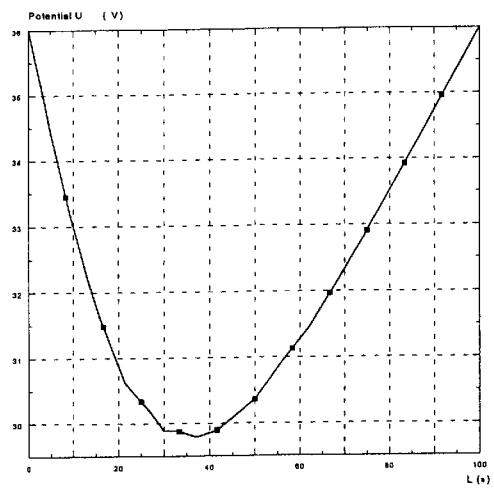
Figure 4:
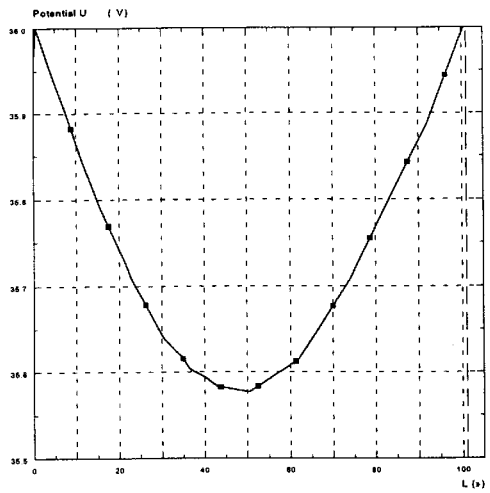

These conditions generated the potential distribution across the cell shown in the four parts of FIG. 4 when measured from the centre of a grid electrode 22 to the corresponding column electrode 11.

In FIG. 4 the traces xV2 correspond to row deselect conditions and the traces xV3 to row select conditions with traces 9Vy referring to column select and traces 10Vy to column deselect. It can be seen that there is a potential well in both row deselect cases so that even when a column is selected, pigment particles will not cross the display. The only arrangement which would cause pigment particles to move from the front of the display to the rear is 9V3, corresponding to row select, column select.

In operation, firstly, to erase any existing information from the display, the grid and row voltages are held low while the column voltages are held high, thus moving all of the particles to the front of the display. The grid electrodes are then placed high (say 36 Volts), after which the row electrodes are all held low (say 0 Volts). Data for display is then written to the column electrodes by placing an intermediate voltage (say 26 Volts), column electrodes with no data being held at the same voltage as the grid (e.g. 36 Volts). The, to write to individual pixels in a row, the voltage on the specific row is raised to the high level (e.g. 36 Volts) for a predetermined period of time, after which the row voltage is lowered again. Data for the next row is then loaded into the columns and the voltage on the next row raised. This procedure continues until all the full screen has been written. The above applies for negatively charged particles, but for positively charged particles, the voltages are changed in sign.

A cell for a display was constructed according to the present invention (see FIG. 6) using the results of the modelling given above. The two halves of the cell were both fabricated using glass as the support substrate 10,20. The electrodes 11,21,22 on both halves of the cell were produced using standard photolithography and etching processes. The front, or viewing side 10 of the cell on which the column electrodes 11 were formed used indium tin oxide (ITO) as the electrode material. The column electrodes were 226 microns wide with a gap between them of 78 microns. The row and grid electrodes 21,22 on the rear side 20 of the cell were formed using chromium metal and had the form and spacing shown in FIGS. 4 and 5.

The dispersion used between the substrates 10,20 was composed largely of perchloroethylene (PCE) (also known as tetrachloroethylene), with a small proportion of added Isopar. A blue dye which was a mixture of Solvent Blue 35 and Oil Red, both supplied by Aldrich Chemical Company, was dissolved in the liquid and yellow pigment particles were also added. A particle charging agent was incorporated in the dispersion.

Figure 6:
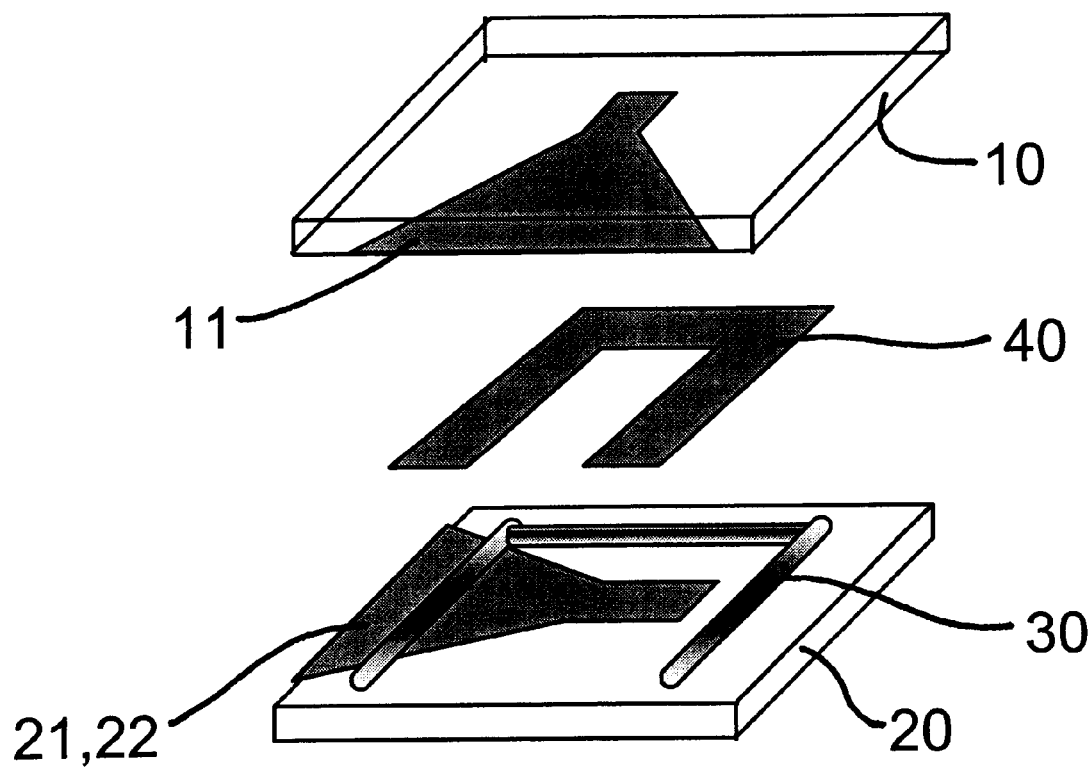
FIG. 6 illustrates detail of an electrophoretic display cell construction.

Edge seals (not shown) were fabricated from a solvent-resistant material, and were made relatively thick in order to provide a long diffusion path to reduce leakage of the PCE. The cell was constructed as shown in FIG. 6, with a U-shaped polyester spacer 40 surrounded by a bead of epoxy resin 30. When the two cell halves were forced together under pressure the epoxy flowed up to the spacer 40 and out around the cell edges forming a wide border seal.

The cell was then vacuum filled with the dispersion, and a further polyester shim inserted into the open end to form a plug. The end was then sealed with epoxy resin.

The edge connections were made with conventional liquid crystal cell edge pins, or by silver paint, to conventional PCB copper tracks.

What is claimed is:

1. An electrophoretic display having a matrix addressing structure comprising:
    a first support structure on one side of the display, and on the inner surface of which are disposed a first set of parallel cathodes or anodes respectively;
    a second support structure on the other side of the display and arranged substantially parallel to the said first support structure, the second support structure having a surface facing the inner surface of the first support structure, said surface having disposed thereon a set of grid electrodes and a parallel set of anodes or cathodes respectively, the grid electrodes and anodes or cathodes being arranged substantially orthogonal to the set of cathodes or anodes respectively and being interspersed with one another.

2. A display according to claim 1, wherein the grid electrodes and the anode or cathodes on the second support structure are interleaved with one another.

3. A display according to claim 1, wherein the grid electrodes and the anode or cathodes on the second support structure are interdigitated with one another.

4. A display according to claim 1, wherein the cathodes or anodes on the first support structure form a set of column electrodes, the grid electrodes are connected in the common, and the anodes or cathodes respectively on the second support structure form a set of row electrodes.

5. A display according to claim 4, wherein the anodes or cathodes respectively on the second support structure are connected in subsets of n electrodes.

6. A display according to claim 5, wherein the anodes or cathodes respectively on the second support structure are connected in subsets of three electrodes.

7. A display according to claim 6, wherein grid electrodes are disposed between each of the outer and center electrodes of each subset of row electrodes.

8. A display according to claim 6, wherein grid electrodes are disposed only between each of the outer and centre electrodes of each subset of row electrodes.

9. A display according to claim 1, wherein the support structures are spaced apart by a distance in the range of 5 to 500 microns.

10. An electronic book having a display according to claim 1.

11. A shelf or similar shop sign for displaying price or other variable information, incorporating a display according to claim 1.

12. A method of operating an electrophoretic display having a matrix structure according to claim 1, the method comprising the steps of:

(A) maintaining the grid electrodes and the anode or cathode electrodes at a relatively low voltage, while maintaining the cathode or anode electrodes at a relatively high voltage;

(B) placing the gride electrodes at a relatively high voltage;

(C) placing a voltage on selected ones of the cathode or anode electrodes intermediate that placed on the grid electrodes and the anode or cathode electrodes;

(D) raising the voltage on a selected one of the anode or cathode electrodes to the level of the voltage on the grid electrodes for a predetermined time and then lowering it again in order to adjust the display of individual pixels in the row corresponding to the selected cathode or anode electrodes; and (E) repeating steps (C) and (D) as required in order to adjust the display of pixels in all rows as required.

13. A display according to claim 2, wherein the cathodes or anodes on the first support structure forms a set common electrodes, the grid electrodes are connected in common, and the anodes or cathodes respectively on the second support structure forms a set of row electrodes.

14. A display according to claim 3, wherein the cathodes or anodes on the first support structure forms a set common electrodes, the grid electrodes are connected in common, and the anodes or cathodes respectively on the second support structure forms a set of row electrodes.

15. An electrophoretic display having a matrix addressing structure comprising:

a first support structure on one side of the display, and on the inner surface of which are disposed at first set of parallel electrodes of a first type;

a second support structure on the other side of the display and arranged substantially parallel to the said first support structure, the second support structure having a surface facing the inner surface of the first support structure, said surface having disposed directly thereon a set of grid electrodes and a parallel set of electrodes of a second type, the grid electrodes and the electrodes of the second type being arranged substantially orthogonal to the set of electrodes of the first type and being interspersed with one another.

* * * * *